(12) United States Patent
Benameur et al.

(10) Patent No.: US 10,936,725 B2
(45) Date of Patent: Mar. 2, 2021

(54) CONTAINER IMAGE VULNERABILITY REDUCTION

(71) Applicant: Accenture Global Solutions Limited, Dublin (IE)

(72) Inventors: Azzedine Benameur, Fairfax, VA (US); Chien An Chen, Fairfax, VA (US); Lei Ding, North Potomac, MD (US)

(73) Assignee: Accenture Global Solutions Limited, Dublin (IE)

( * ) Notice: Subject to any disclaimer, the term of this patent is extended or adjusted under 35 U.S.C. 154(b) by 227 days.

(21) Appl. No.: 16/163,197

(22) Filed: Oct. 17, 2018

(65) Prior Publication Data

US 2020/0125731 A1   Apr. 23, 2020

(51) Int. Cl.
 *G06F 21/57* (2013.01)
 *G06F 16/16* (2019.01)
 *G06F 9/455* (2018.01)
 *G06F 9/54* (2006.01)

(52) U.S. Cl.
 CPC ........ *G06F 21/577* (2013.01); *G06F 9/45558* (2013.01); *G06F 9/545* (2013.01); *G06F 16/16* (2019.01); *G06F 2009/45587* (2013.01)

(58) Field of Classification Search
 CPC .... G06F 21/577; G06F 9/45558; G06F 9/545; G06F 2009/45587
 USPC .......................................................... 726/25
 See application file for complete search history.

(56) References Cited

U.S. PATENT DOCUMENTS

| 7,739,312 B2 | 6/2010 | Gordon et al. |
| 8,661,406 B2 | 2/2014 | Shapiro |
| 2016/0019317 A1 | 1/2016 | Pawar et al. |
| 2017/0153930 A1* | 6/2017 | Philips .................... G06F 9/543 |
| 2017/0300311 A1 | 10/2017 | Vasquez et al. |
| 2018/0025160 A1 | 1/2018 | Hwang et al. |
| 2018/0275987 A1* | 9/2018 | Vandeputte ............... G06F 8/71 |

(Continued)

FOREIGN PATENT DOCUMENTS

| CN | 108415795 | | 8/2018 |
| JP | 2019028689 A | * | 2/2019 |

OTHER PUBLICATIONS

Rad, Secure Image Processing Inside Cloud File Sharing Environment Using Lightweight Containers, IEEE, 978-1-4799-8633-0/15, 2015 (Year: 2015).*

(Continued)

*Primary Examiner* — Peter C Shaw
(74) *Attorney, Agent, or Firm* — Fish & Richardson P.C.

(57) ABSTRACT

Methods, systems, and apparatus, including computer programs encoded on a computer storage medium, for container image vulnerability reduction. In one aspect, a method includes obtaining a first container image that is formed from a set of files, determining that a first particular file of the set of files is necessary for an application and a second particular file of the set of files is not necessary for the application based on execution of the application in a first container instantiated with the first container image, in response generating a second container image from the first particular file and not from the second particular file, and executing the application in a second container instantiated with the second container image.

20 Claims, 4 Drawing Sheets

(56) References Cited

U.S. PATENT DOCUMENTS

2019/0095441 A1* 3/2019 Scrivano ................. G06F 16/51
2020/0019388 A1* 1/2020 Jaeger ................... G06F 9/5055

OTHER PUBLICATIONS

Kapusta et al., "Data protection by means of fragmentation in distributed storage systems", doi: 10.1109/NOTERE.2015.7293486, 2015, pp. 1-8. (Year: 2015).*

EP Search Report in European Application No. EP19203257, dated Mar. 3, 2020, 8 pages.

* cited by examiner

CONTAINER IMAGE VULNERABILITY REDUCTION

FIELD

This specification relates to computer security.

BACKGROUND

Container images may be used to run applications. For example, a container image may include a number of libraries used in execution of an application.

SUMMARY

This document describes techniques, methods, systems, and other mechanisms for container image vulnerability reduction. Containers may provide virtual environments that group and isolate processes and resources from a host and other containers. For example, a first application that executes in a first container hosted by an operating system may be isolated from a second application that executes in a second container hosted by the operating system. A container may be distinguished from a virtual machine in that containers may share a same kernel of an operating system that hosts the containers. For example, a first container and second container may both share read only access to some resources provided by the kernel. Accordingly, containers may be more light weight than virtual machines.

Containers may be instantiated from container images, and the container images may be designed to include only files necessary to execute a particular application in the container. However, during creation and maintenance, containers may end up having a much larger size as they may include unneeded files that expose vulnerabilities. A system may reduce the vulnerabilities in a container image for an application, and additionally reduce a size of the container image, based on identifying files that are needed to execute the application and then creating a new container image with only those files.

The system may identify files that are needed to execute the application by monitoring the container and operating system that hosts the container while the application is being used. The system may then rebuild a new container image from the files in the original container image that are determined to be necessary. The new container image may then be used to execute the application instead of the original container.

Accordingly, one advantage provided may be that vulnerabilities in a container image are reduced while enabling a container to execute an application. For example, a second container image may be used to execute an application that a first container image may be used to execute, but also not include some files in the first container image that expose vulnerabilities in a container instantiated from the first container image. Another advantage may be that the size of a container image may be reduced while enabling a container to execute an application. For example, because a second container image may exclude some files that the first container image includes, the second container image may take less storage and be transmitted faster than the first container image. The reduction in size of the container image from the first container image to the second container image may correspond to the size of the files in the first container image that are not included in the second container image. Additionally, a container instantiated from the second container image may use less memory than a container instantiated from the first container image.

One innovative aspect of the subject matter described in this specification is embodied in a method that includes the actions of obtaining a first container image that is formed from a set of files, determining that a first particular file of the set of files is necessary for an application and a second particular file of the set of files is not necessary for the application based on execution of the application in a first container instantiated with the first container image, in response to determining that the first particular file of the set of files is necessary for an application and the second particular file of the set of files is not necessary for the application based on execution of the application in the first container instantiated with the first container image, generating a second container image from the first particular file and not from the second particular file, and executing the application in a second container instantiated with the second container image.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects determining that a first particular file of the set of files is necessary for an application and a second particular file of the set of files is not necessary for the application based on execution of the application in the first container instantiated with the first container image includes obtaining, from a kernel of an operating system that hosts the first container, an indication that a file system event of accessing was performed with the first particular file. In certain aspects, determining that a first particular file of the set of files is necessary for an application and a second particular file of the set of files is not necessary for the application based on execution of the application in the first container instantiated with the first container image includes determining that a function that uses the first particular file was called.

In some implementations, determining that a first particular file of the set of files is necessary for an application and a second particular file of the set of files is not necessary for the application based on execution of the application in the first container instantiated with the first container image includes determining that a predetermined time period has elapsed without the second particular file being accessed. In certain aspects, determining that a first particular file of the set of files is necessary for an application and a second particular file of the set of files is not necessary for the application based on execution of the application in the first container instantiated with the first container image includes determining that a predetermined time period has elapsed without a function that uses the second particular file being called.

In some aspects, generating a second container image from the first particular file and not from the second particular file includes copying the first particular file into a new folder with a subfolder that matches a subfolder of the first particular file in the first container image and generating the second container image based on the subfolder structure of files within the new folder. In some implementations, generating a second container image from the first particular file and not from the second particular file includes updating symbolic links in files within the new folder to use the new folder. In certain aspects, actions include identifying a first set of vulnerabilities in the first container image, identifying a second set of vulnerabilities in the second container image, and providing an indication of a difference between the first set of vulnerabilities and the second set of vulnerabilities.

Details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
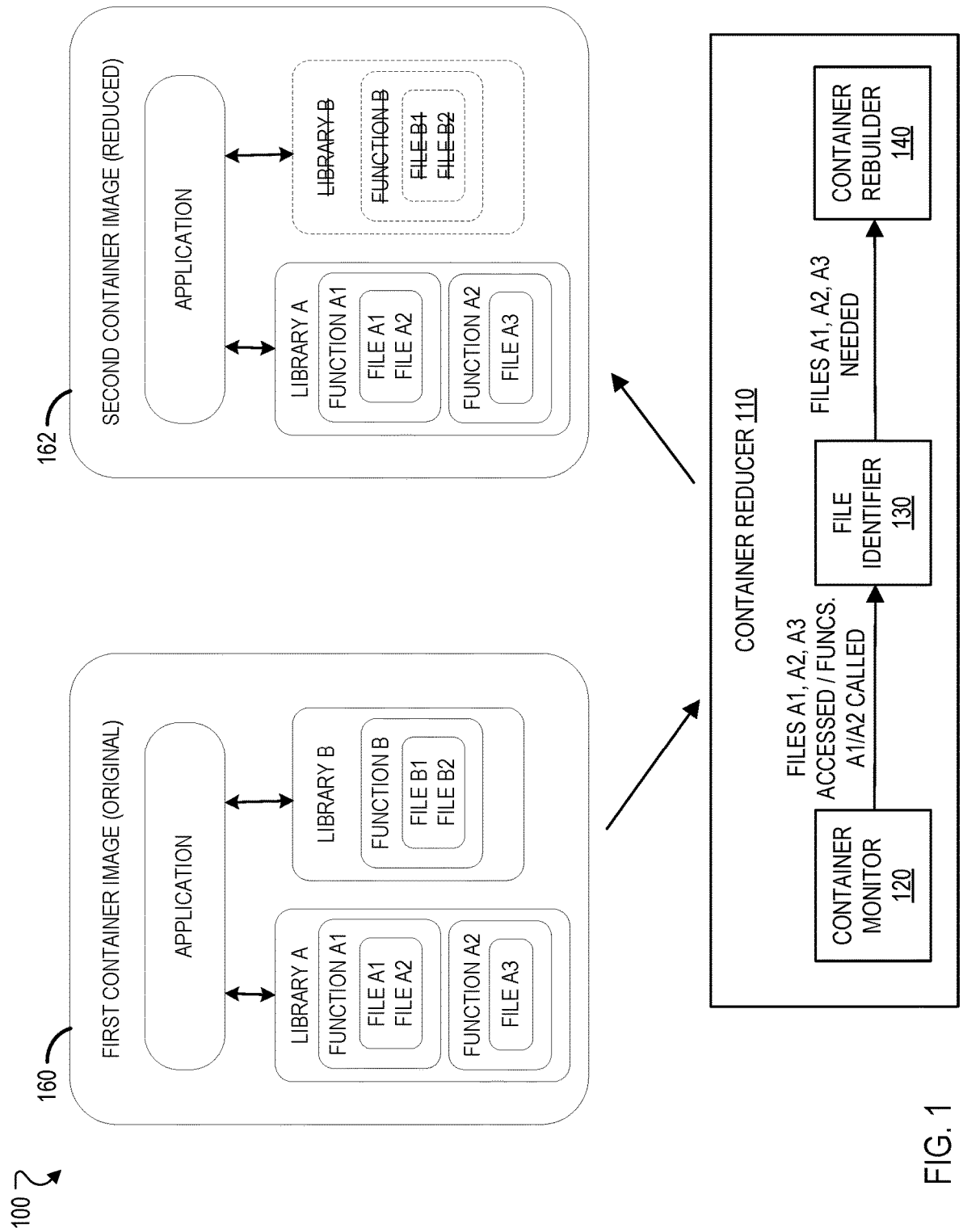
FIG. 1 is a conceptual diagram of an example system for container image vulnerability reduction.

FIG. 1 is a conceptual diagram of an example system 100 for container image vulnerability reduction. The system 100 includes a container reducer 110 that reduces vulnerabilities in container images. For example, the container reducer 110 may receive a first container image 160 and then generate a second container image 162 that excludes some files that expose vulnerabilities.

As shown in FIG. 1, the container reducer 110 receives a first container image 160. The first container image 160 may be configured to instantiate a container in which a particular application can be executed. To enable execution of the particular application, the first container image 160 may include one or more libraries. For example, the first container image may include Library A and Library B. A library may be a collection of files that provide functions that may be called upon by an application executed in a container. For example, Library A includes File A1 and File A2, that together are used to provide Function A1, and File A3, that provides Function A2, and Library B includes File B1 and File B2 that together provide Function B.

The container reducer 110 may determine files in the first container image 160 that are unnecessary for executing the application and reduce vulnerabilities in the first container image 160 by generating the second container image 162 that excludes those files. For example, the container reducer 110 may generate the second container image 162 that excludes File B1 and File B2, so does not provide Function B for the application and does not include Library B, but also does not includes vulnerabilities exposed by File B1 and B2 and Library B. Accordingly, the second container image 162 may have reduced vulnerabilities and size compared to the first container image 160, while still being able to execute the application.

The container reducer 110 may include a container monitor 120, a file identifier 130, and a container rebuilder 140 that are used to determine files in the first container image 160 that are unnecessary for executing the application and generate the second container image 162.

The container monitor 120 may monitor events that occur during execution of the application in a container instantiated from the first container image 160. For example, the container monitor 120 may determine that during a one week period of execution, Files A1, A2, and A3 were accessed and Function A1 was called. The container monitor 120 may monitor events by obtaining file system access events. For example, each time a file is accessed, the container monitor 120 may receive a file system access event from a kernel of an operating system that hosts the container, where the file system access event indicates the file that was accessed. In another example, each time a function is called by an application, the container monitor 120 may receive an indication of the function that was called.

The container monitor 120 may provide an indication to the file identifier 130 of the events that occurred during execution of the application in the container. For example, the container monitor 120 may log that during a one week period that only Files A1, A2, and A3 were accessed and both Function A1 and Function A2 were called, and provide the names of those files and functions to the file identifier 130. In another example, the container monitor 120 may not log any accesses of Files B1 and B2 or calls for Function B during the one week period and, in response, not provide the names of those files and functions to the file identifier 130.

The file identifier 130 may identify files that are necessary for executing the application based on the events detected by the container monitor 120. For example, the file identifier 130 may determine that as the container monitor 120 indicated that Files A1, A2, and A3 were accessed and both Function A1 and Function A2 were called, Files A1, A2, and A3 are necessary for execution of the application.

The file identifier 130 may provide an indication of the files that the file identifier 130 identified as necessary to execution the application to the container rebuilder 140. For example, the file identifier 130 may identify that only Files A1, A2, A3 are necessary out of all the files in the first container image 160 and, in response, provides the names of Files A1, A2, and A3 to the container rebuilder 140 without the names of Files B1 and B2.

The container rebuilder 140 may generate the second container image 162 based on the files indicated by the file identifier 130 as necessary for execution of the application. For example, the container rebuilder 140 may receive an indication from the file identifier 130 that Files A1, A2, and A3 are needed and, in response, generate the second container image 162 that includes Files A1, A2, and A3 but doesn't include Files B1 and B2.

Figure 2:
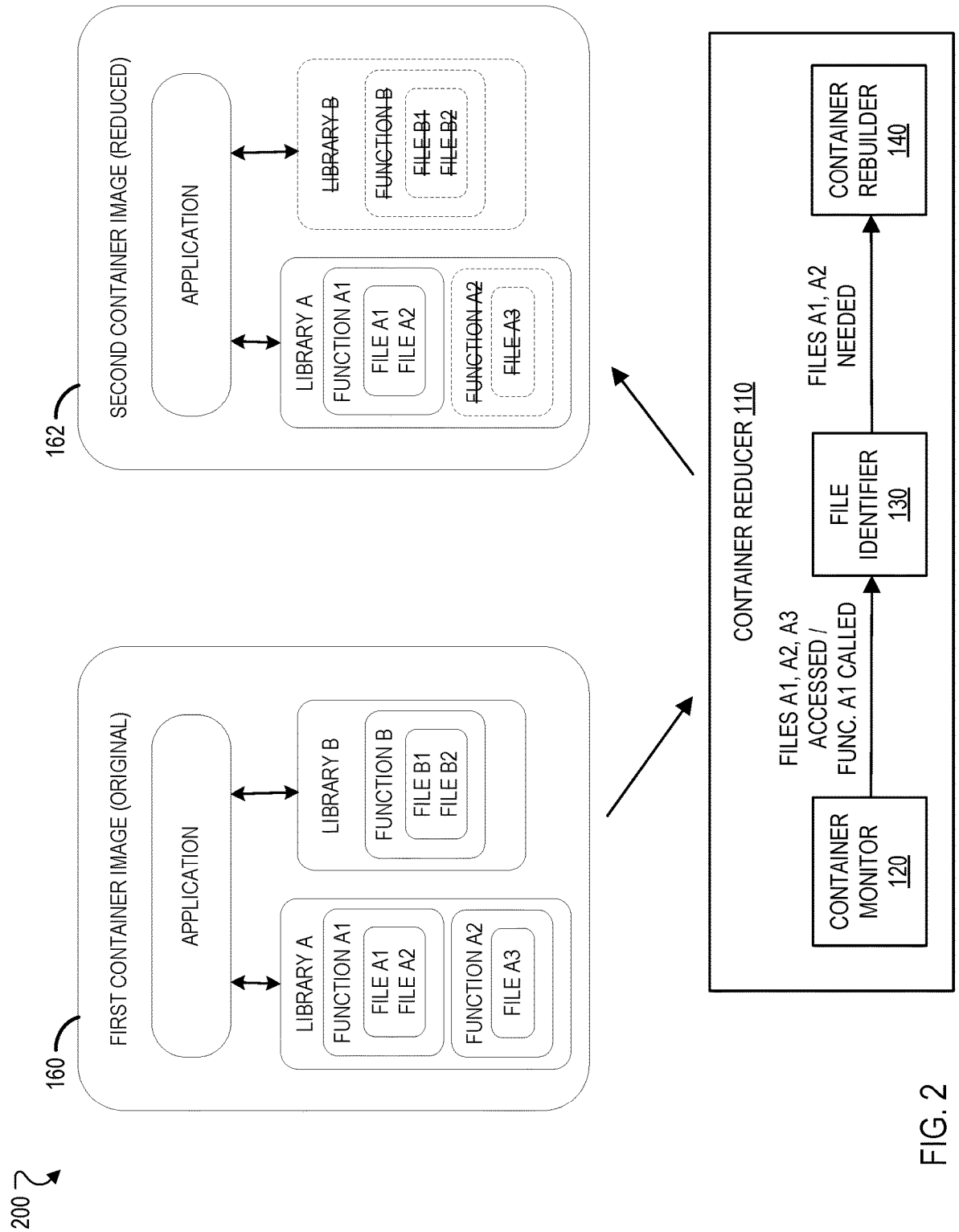
FIG. 2 is another conceptual diagram of the example system for container image vulnerability reduction.

FIG. 2 is another conceptual diagram of the example system 200 for container image vulnerability reduction. In some implementations, once an application calls a function of a library, all of the files of the library are accessed and loaded into memory even if the function does not use all the files in the library. For example, when Function A of Library A is called, a kernel of an operating system may access the contents of Files A1 and A2 that provide Function A1 and also access the contents of File A3 that provide Function A2, even if Function A2 is never called.

In some implementations, the file identifier 130 may determine that a file that the container monitor 120 indicates was accessed is not necessary based on the functions that the container monitor 120 indicates were called. For example, the file identifier 130 may determine that even though Files A1, A2, and A3 were accessed, only Function A1 was called so only Files A1 and A2 are necessary to provide Function A1 but A3 actually is not necessary as it was only accessed because Function A1 was called. In the example, the file identifier 130 may then indicate to the container rebuilder 140 that only Files A1 and A2 are necessary and the container rebuilder 140 may then generate the second container image 162 that includes Files A1 and A2 but does not include Files A3, B1, and B2.

Figure 3:
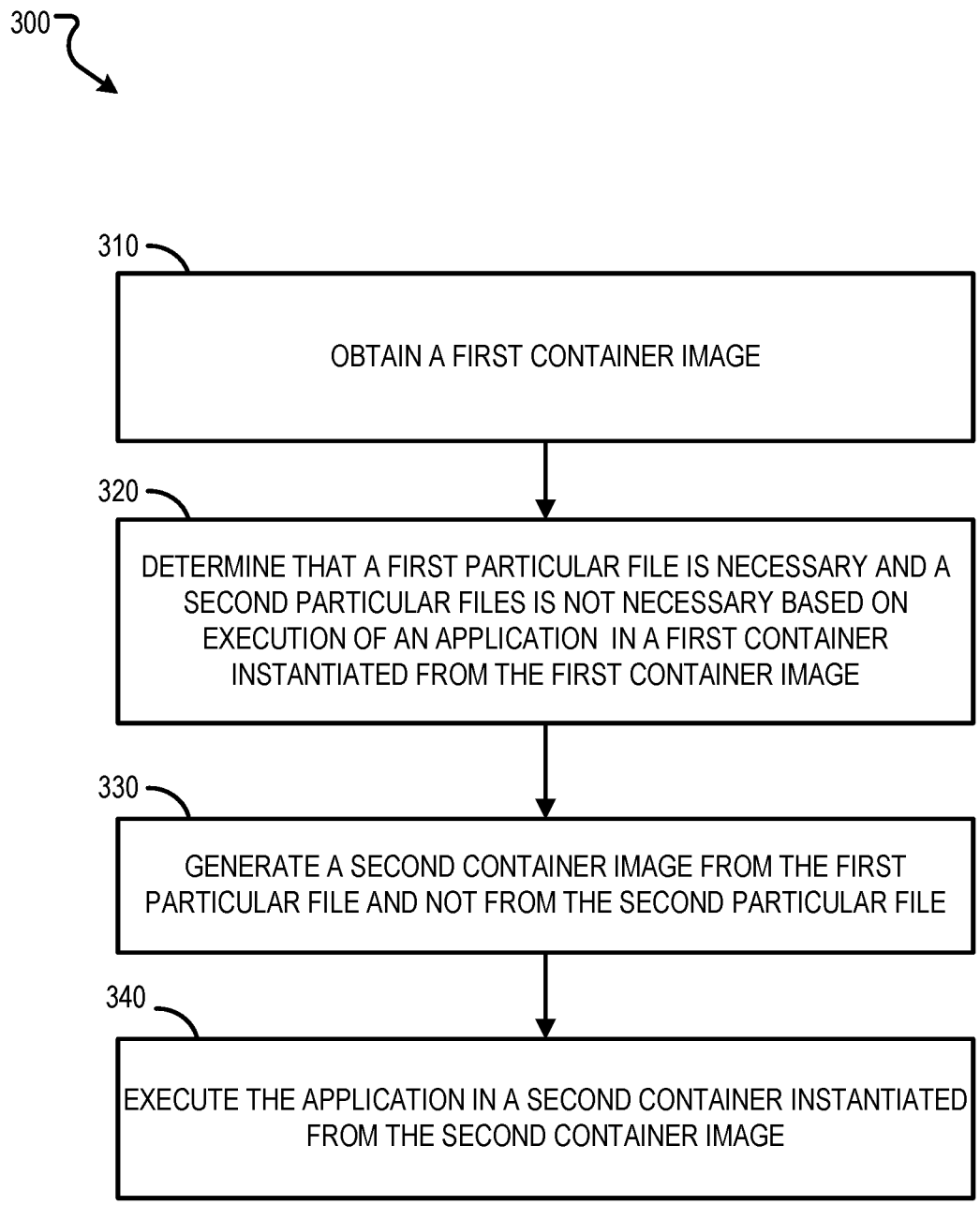
FIG. 3 is a flow diagram that illustrates an example of a process for container image vulnerability reduction.

FIG. 3 is a flow diagram that illustrates an example of a process 300 for container image vulnerability reduction. The operations of the process 300 may be performed by the systems 100, 200 or other systems.

The process 300 includes obtaining a first container image (310). For example, the container monitor 120 may obtain a first container image that is formed from Files A1, A2, A3, B1, and B3.

The process 300 includes determining that a first particular file of the set of files is necessary for an application and a second particular file of the set of files is not necessary for the application based on execution of the application in a first container instantiated with the first container image (320). For example, the file identifier 130 may receive an indication from the container monitor 120 that during a three day usage period of the application within a container instantiated from the first container image, Files A1, A2, A3 were accessed and, in response, determine that Files A1, A2, A3 are necessary to execute the application in a container instantiated from the first container image and Files B1 and B2 are not necessary to execute the application in a container instantiated from the first container image.

In some implementations, determining that a first particular file of the set of files is necessary for an application and a second particular file of the set of files is not necessary for the application based on execution of the application in the first container instantiated with the first container image includes obtaining, from a kernel of an operating system that hosts the first container, an indication that a file system event of accessing was performed with the first particular file. For example, each time a file is accessed, the container monitor 120 may receive a notification from the kernel of the operating system with the name of the file and the file identifier 130 may determine those files accessed are necessary to execute the application and those files not notified as being accessed are not necessary to execute the application.

In some implementations, determining that a first particular file of the set of files is necessary for an application and a second particular file of the set of files is not necessary for the application based on execution of the application in the first container instantiated with the first container image includes determining that a function that uses the first particular file was called. For example, each time a function is called, the container monitor may receive a notification with the name of the function and the file identifier 130 may identify the files that correspond to the named functions and determine those identified files are necessary and that other file that don't correspond to any named functions are not necessary.

In some implementations, determining that a first particular file of the set of files is necessary for an application and a second particular file of the set of files is not necessary for the application based on execution of the application in the first container instantiated with the first container image includes determining that a predetermined time period has elapsed without the second particular file being accessed. For example, the file identifier 130 may determine that three days, five days, seven days, or some other number of days has passed while the application has been run in a container instantiated from the first container image and because the second particular file was not accessed during those days, the second particular file is not necessary.

In some implementations, determining that a first particular file of the set of files is necessary for an application and a second particular file of the set of files is not necessary for the application based on execution of the application in the first container instantiated with the first container image includes determining that a predetermined time period has elapsed without a function that uses the second particular file being called. For example, the file identifier 130 may determine that three days, five days, seven days, or some other number of days has passed while the application has been run in a container instantiated from the first container image and because no function that is provided by the second particular file was accessed during those days, the second particular file is not necessary.

In some implementations, the file identifier 130 may determine a file is necessary if the file was accessed or if a function provided by the file was called, or both. In some other implementations, the file identifier 130 may determine a file is necessary only if both the file was accessed and if a function provided by the file was called.

The process 300 includes, in response to determining that the first particular file of the set of files is necessary for an application and the second particular file of the set of files is not necessary for the application based on execution of the application in the first container instantiated with the first container image, generating a second container image from the first particular file and not from the second particular file (330). For example, the container rebuilder 140 may generate the second container image that includes Files A1, A2, and A3 but does not include Files B1 and B2.

In some implementations, generating a second container image from the first particular file and not from the second particular file includes copying the first particular file into a new folder with a subfolder that matches a subfolder of the first particular file in the first container image and generating the second container image based on the subfolder structure of files within the new folder. For example, the container rebuilder 140 may create a new folder named "reduced," determine that the path of File A1 in the first container image is "\library A\," in response, create a subfolder named "library A" in the folder named "reduced," put a copy of File A1 in the subfolder "library A," do the same for all other files indicated as necessary, and then generate a container image from all the contents in the new folder.

In some implementations, generating a second container image from the first particular file and not from the second particular file includes updating symbolic links in files within the new folder to use the new folder. For example, the container rebuilder 140 may determine that the new folder includes a file with a reference to the folder named "original" and, in response, change the reference to the folder "reduced."

In some implementations, when a file is copied from the first container image to the "reduced" directory, the file's permission, owner, and group need to be updated to match the context in the first container image. By default, when a file is copied to a temporary "reduced" directory, the file's owner, group, and permission will be changed to the user and group on the host where the file is copied to. Generally, the owner and group of the file in the first container do not exist on the host where the "reduced" directory is created, so the container rebuilder 140 may "hard-code" the appropriate owner, group, permission into files in the new directory. Additionally or alternatively, in some implementations the file that the file identifier 130 identifies may not exist in the first container image because it is a short-lived temporary file that was created and removed within a very short time. The container rebuilder 140 may need to skip these kind of files or directories. Accordingly, the container rebuilder 140 may determine whether each file identified by the file identifier 130 is a temporary file and, if not, copy the file to the new directory. In some implementations, the container rebuilder 140 may determine whether the file is a temporary file based on a file name.

The process 300 includes executing the application in a second container instantiated with the second container image (340). For example, the container rebuilder 140 may provide the second container image to be distributed to various other devices to instantiate a container that has less vulnerabilities than a container from the first container image.

In some implementations, the process 300 includes identifying a first set of vulnerabilities in the first container image, identifying a second set of vulnerabilities in the second container image, and providing an indication of a difference between the first set of vulnerabilities and the second set of vulnerabilities. For example, the system 100 may identify vulnerabilities in the first container image based on a hash of the files or layers of the first container image, identify vulnerabilities in the second container image, based on a hash of the files or layers of the second container image, and then provide for display to a user a side by side report of vulnerabilities before reduction by the container reducer 110 and vulnerabilities after reduction.

Figure 4:
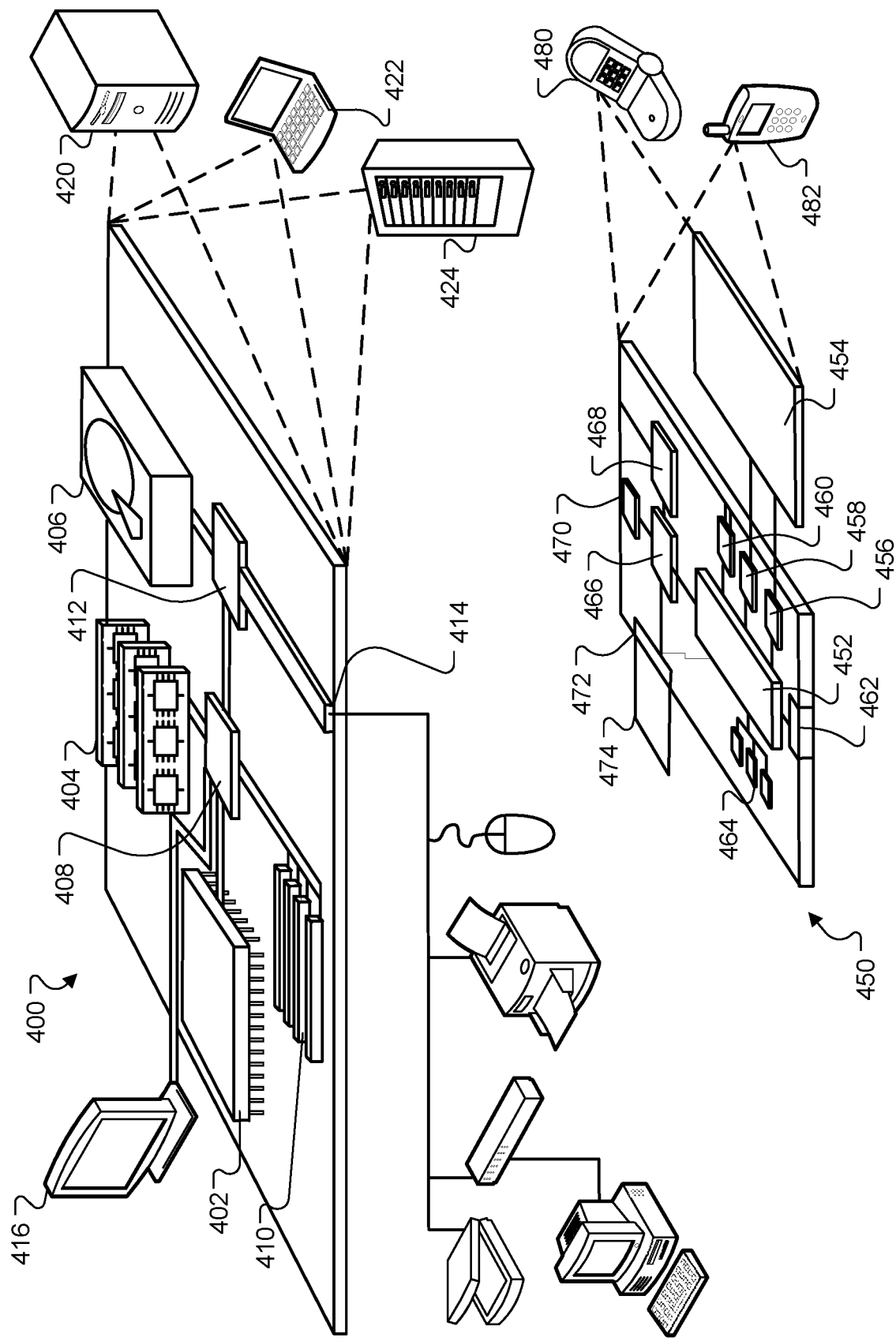
FIG. 4 is a block diagram of examples of computing devices that may be used to implement the systems and methods described in this document.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    obtaining a first container image that is formed from a set of files;
    determining that a first particular file of the set of files is necessary for an application and a second particular file of the set of files is not necessary for the application based on execution of the application in a first container instantiated with the first container image;
    in response to determining that the first particular file of the set of files is necessary for an application and the second particular file of the set of files is not necessary for the application based on execution of the application in the first container instantiated with the first container image, generating a second container image from the first particular file and not from the second particular file; and
    executing the application in a second container instantiated with the second container image,
    wherein determining that the first particular file of the set of files is necessary for the application and the second particular file of the set of files is not necessary for the application based on execution of the application in the first container instantiated with the first container image includes obtaining, from a kernel of an operating system that hosts the first container, an indication that a file system event of accessing was performed with the first particular file.

2. The method of claim 1, wherein determining that a first particular file of the set of files is necessary for an application and a second particular file of the set of files is not necessary for the application based on execution of the application in the first container instantiated with the first container image comprises:
    determining that a function that uses the first particular file was called.

3. The method of claim 1, wherein determining that a first particular file of the set of files is necessary for an application and a second particular file of the set of files is not necessary for the application based on execution of the application in the first container instantiated with the first container image comprises:
    determining that a predetermined time period has elapsed without the second particular file being accessed.

4. The method of claim 1, wherein determining that a first particular file of the set of files is necessary for an application and a second particular file of the set of files is not necessary for the application based on execution of the application in the first container instantiated with the first container image comprises:
    determining that a predetermined time period has elapsed without a function that uses the second particular file being called.

5. The method of claim 1, wherein generating a second container image from the first particular file and not from the second particular file comprises:
    copying the first particular file into a new folder with a subfolder that matches a subfolder of the first particular file in the first container image; and
    generating the second container image based on the subfolder structure of files within the new folder.

6. The method of claim 5, wherein generating a second container image from the first particular file and not from the second particular file comprises:
    updating symbolic links in files within the new folder to use the new folder.

7. The method of claim 1, comprising:
identifying a first set of vulnerabilities in the first container image;
identifying a second set of vulnerabilities in the second container image; and
providing an indication of a difference between the first set of vulnerabilities and the second set of vulnerabilities.

8. A system comprising:
one or more computers and one or more storage devices storing instructions that are operable, when executed by the one or more computers, to cause the one or more computers to perform operations comprising:
obtaining a first container image that is formed from a set of files;
determining that a first particular file of the set of files is necessary for an application and a second particular file of the set of files is not necessary for the application based on execution of the application in a first container instantiated with the first container image;
in response to determining that the first particular file of the set of files is necessary for an application and the second particular file of the set of files is not necessary for the application based on execution of the application in the first container instantiated with the first container image, generating a second container image from the first particular file and not from the second particular file; and
executing the application in a second container instantiated with the second container image,
wherein determining that the first particular file of the set of files is necessary for the application and the second particular file of the set of files is not necessary for the application based on execution of the application in the first container instantiated with the first container image includes obtaining, from a kernel of an operating system that hosts the first container, an indication that a file system event of accessing was performed with the first particular file.

9. The system of claim 8, wherein determining that a first particular file of the set of files is necessary for an application and a second particular file of the set of files is not necessary for the application based on execution of the application in the first container instantiated with the first container image comprises:
determining that a function that uses the first particular file was called.

10. The system of claim 8, wherein determining that a first particular file of the set of files is necessary for an application and a second particular file of the set of files is not necessary for the application based on execution of the application in the first container instantiated with the first container image comprises:
determining that a predetermined time period has elapsed without the second particular file being accessed.

11. The system of claim 8, wherein determining that a first particular file of the set of files is necessary for an application and a second particular file of the set of files is not necessary for the application based on execution of the application in the first container instantiated with the first container image comprises:
determining that a predetermined time period has elapsed without a function that uses the second particular file being called.

12. The system of claim 8, wherein generating a second container image from the first particular file and not from the second particular file comprises:

copying the first particular file into a new folder with a subfolder that matches a subfolder of the first particular file in the first container image; and
generating the second container image based on the subfolder structure of files within the new folder.

13. The system of claim 12, wherein generating a second container image from the first particular file and not from the second particular file comprises:
updating symbolic links in files within the new folder to use the new folder.

14. The system of claim 8, the operations comprising:
identifying a first set of vulnerabilities in the first container image;
identifying a second set of vulnerabilities in the second container image; and
providing an indication of a difference between the first set of vulnerabilities and the second set of vulnerabilities.

15. A non-transitory computer-readable medium storing instructions executable by one or more computers which, upon such execution, cause the one or more computers to perform operations comprising:
obtaining a first container image that is formed from a set of files;
determining that a first particular file of the set of files is necessary for an application and a second particular file of the set of files is not necessary for the application based on execution of the application in a first container instantiated with the first container image;
in response to determining that the first particular file of the set of files is necessary for an application and the second particular file of the set of files is not necessary for the application based on execution of the application in the first container instantiated with the first container image, generating a second container image from the first particular file and not from the second particular file; and
executing the application in a second container instantiated with the second container image,
wherein determining that the first particular file of the set of files is necessary for the based on execution of the application in the first container instantiated with the first container image includes obtaining, from a kernel of an operating system that hosts the first container, an indication that a file system event of accessing was performed with the first particular file.

16. The medium of claim 15, wherein determining that a first particular file of the set of files is necessary for an application and a second particular file of the set of files is not necessary for the application based on execution of the application in the first container instantiated with the first container image comprises:
determining that a function that uses the first particular file was called.

17. The medium of claim 15, wherein determining that a first particular file of the set of files is necessary for an application and a second particular file of the set of files is not necessary for the application based on execution of the application in the first container instantiated with the first container image comprises:
determining that a predetermined time period has elapsed without the second particular file being accessed.

18. The medium of claim 15, wherein generating a second container image from the first particular file and not from the second particular file comprises:

copying the first particular file into a new folder with a subfolder that matches a subfolder of the first particular file in the first container image; and generating the second container image based on the subfolder structure of files within the new folder.

19. The medium of claim 18, wherein generating a second container image from the first particular file and not from the second particular file comprises:

updating symbolic links in files within the new folder to use the new folder.

20. The medium of claim 15, the operations comprising:

identifying a first set of vulnerabilities in the first container image;

identifying a second set of vulnerabilities in the second container image; and providing an indication of a difference between the first set of vulnerabilities and the second set of vulnerabilities.

* * * * *